United States Patent Office 3,214,463
Patented Oct. 26, 1965

3,214,463
UV-ABSORBING SULFONATED BENZOPHENONE DERIVATIVES
Arnold Charles Schoenthaler, East Brunswick, and Jacob Quentin Umberger, Holmdel, N.J., assignors to E. I. du Pont de Nemours and Company, Wilmington, Del., a corporation of Delaware
No Drawing. Filed May 12, 1960, Ser. No. 28,523
8 Claims. (Cl. 260—507)

This invention relates to new compositions of matter useful in photography and to the process for preparing the compositions. More particularly it relates to new compositions which are useful as ultraviolet stabilizers and filters in color photographic films. Still more particularly it relates to the preparation of the compositions using benzophenone type compounds. Specifically, this invention relates to the modification of known ultraviolet absorbing compounds to obtain novel, water-dispersible or water-soluble non-diffusible compositions.

Ultraviolet absorbing compounds are well known in the art, particularly in the color photography art. These compounds protect certain components in color photographic films, e.g., dye images and residual couplers in the emulsion layer, from being attacked by ultraviolet radiation. These compounds also act as filters and prevent undesired ultraviolet response in the emulsion layers. The ultraviolet absorbing compounds can be incorporated in the photographic element in many ways, e.g., they can be dissolved or dispersed in a colloidal binder and coated over the light-sensitive layer, they may be coated as an intermediate layer, or they may be incorporated in the light-sensitive layer. The original benzophenone ultraviolet absorbers are not water soluble but are dispersible or soluble in an organic solvent. While it is desirable to have water-soluble ultraviolet absorbers, it is also desirable to have such compounds which are non-migratory or non-diffusible in multi-layer photographic elements. To improve the non-migratory or non-diffusibility properties of the ultraviolet absorbers, weighting groups are added; sulfo groups are added to insure water solubility or water dispersibility, e.g., see Meyer and Bettesch, Z. wiss. Phot. 45, 226–233 (1950).

An object of this invention is to provide novel compositions of matter which are useful as ultraviolet stabilizers and filters in color photographic films. Another object is to provide such compositions which are non-migratory and yet are water soluble or are water dispersible. Yet another object is to provide such compositions which are easily coated or incorporated in a photographic element. A further object is to provide a novel method of preparing said compositions. Still further objects will be apparent from the following description of the invention.

The above objects are accomplished by this invention which relates to the following new compositions of matter:

(1)

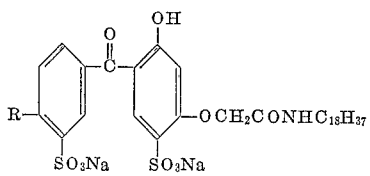

wherein R is an alkoxy radical of 1 to 5 carbons, an aryloxy radical of 6 to 11 carbons, a dialkylamino radical of 2 to 10 carbons, a diarylamino radical of 12 to 22 carbons and an alkanoyl amino radical of 2 to 5 carbons.

4-BENZOYL-3-HYDROXY-N-OCTADECYL-6-SULFOPHE-NOXYACETAMIDE SODIUM SALT (2)

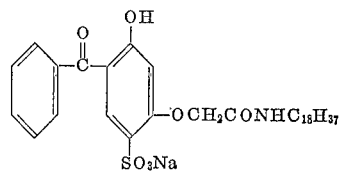

This invention also relates to the novel method for preparing the above-described compositions of matter which comprises reacting an ultraviolet absorbing compound, e.g., a benzophenone compound, having at least one non-chelated hydroxy group in the meta or para position to the carbonyl radical, and which may also have an alkoxy, aryloxy, dialkylamino, diarylamino and acylamino radical, with a modifying compound, i.e., an alkyl or aryl ester of a haloacid taken from the class consisting of bromine and chlorine, e.g., ethyl bromoacetate, ethyl chloroacetate, phenyl bromoacetate, phenyl chloroacetate, etc. The resultant benzoylhydroxyphenoxyacetates are condensed with an octadecyl primary or secondary amine and then sulfonated, e.g., by treating with sulfuric acid. The sulfonated compound can then be converted to the sodium salt by reacting it with a water-soluble sodium salt, e.g., NaCl. The resulting compounds can then be used in color photographic elements, the colors of which are affected by ultraviolet radiation within the wavelengths of 2500 to 4000 A.

The preferred methods for preparing the preferred form of compound (1), i.e., 3-hydroxy-4-(4-methoxy-3-sulfobenzoyl)-N-octadecyl-6-sulfophenoxyacetamide sodium salt, and compound (2), i.e., 4-benzoyl-3-hydroxy-N-octadecyl-6-sulfophenoxyacetamide sodium salt, are described in Examples I and II respectively.

The invention will be further illustrated by, but is not intended to be limited to the following examples:

EXAMPLE I

*Preparation of 3-hydroxy-4-(4-methoxy-3-sulfobenzoyl)-N-octadecyl-6-sulfophenoxyacetamide sodium salt*

A. 2,4-DIHYDROXY-4'-METHOXYBENZOPHENONE

This compound was prepared by the method described by Grover, Shah and Shah, J. Chem. Soc. 1955, 3982 using a mixture 30.4 g. (0.20 mole) of anisic acid, 33.0 g. (0.30 mole) of resorcinol, 60 g. (0.23 mole) of freshly fused zinc chloride and 140 ml. of phosphorus oxychloride. The mixture was maintained at a temperature of 75° C. for one hour, and the dark red mixture was poured after cooling to room temperature into a large excess of ice-water. The red precipitate which formed was filtered, washed with water and triturated with 400 ml. of a 10% by weight solution of sodium bicarbonate. The precipitate was refiltered and washed with water. Forty six grams (95.3% yield) of pale orange powder, melting point 159 to 161° C. was obtained. The crude product was boiled with 1500 ml. of benzene, the solution was filtered, and after concentrating the filtrate to 1 liter, the solution was allowed to cool. Thirty-six and one tenths grams of orange needles in fan-shaped clusters was obtained, melting point 163° to 164° C. A second recrystallization was performed as described above, 29.4 g. of orange needles being obtained, melting point 163.5 to 164.0° C. The filtrate of the first crystallization when concentrated yielded 1.51 g. of needles, melting point 163.0 to 163.5° C. The total yield was 30.9 g., a 63.2 percent yield of material with a melting point in the range of 163 to 164° C., as compared to the reported melting point of 165° C. reported by Komarowski and Kostanecki, Ber. 27, 2000 (1894).

B. PHENYL-3-HYDROXY-4-(4-METHOXY-BENZOYL) PHENOXYACETATE

A mixture of 122.0 g. (0.50 mole) of 2,4-dihydroxy-4'-methoxybenzophenone prepared as described above in Example IA, 108 g. (0.50 mole) of phenylbromoacetate, and 69 g. (0.50 mole) of finely powdered $K_2CO_3$ (through 100 mesh screen) was refluxed in 1200 ml. of acetone for 2.5 days. The mixture was cooled and poured with vigorous stirring into a solution consisting of 200 ml. of 12 molar HCl, 3 liters of $H_2O$ and 3 kg. of ice, filtered, washed in water and air dried. One hundred sixty-five grams (87.3% by weight yield) of a yellow-green powder, melting point 159 to 168° C., was obtained.

C. 3-HYDROXY-4-(4-METHOXYBENZOYL)-N-OCTADECYLPHENOXYACETAMIDE

A mixture of 165 g. (0.437 mole) of phenyl-3-hydroxy-4-(4-methoxybenzoyl)phenoxyacetate prepared as described in Example IB above and 118 g. (0.437 mole) of octadecylamine was heated at 140 to 150° C. for 24 hours under a stream of nitrogen. During the first hour, the distillate appeared to be mainly water and the mixture was cloudy. Thereafter the solution was a clear dark brown and phenol began to be swept over. The dark reaction mass, after cooling to 100° C., was poured into 1500 ml. of methanol, a heavy orange precipitate forming. The slurry was cooled in an ice bath, filtered and washed with methanol. After air drying, 206 g. of a pale orange-pink powder, melting point 94 to 96° C. remained. The crude product was dissolved in 1500 ml. of hot glacial acetic acid and was allowed to cool slowly. One hundred thirty-seven grams (56.6% by weight yield) of a pink-orange solid melting at 98 to 99° C. separated.

D. 3-HYDROXY - 4 - (4-METHOXY - 3 - SULFOBENZOYL)-N-OCTADECYL - 6 - SULFOPHENOXYACETAMIDE SODIUM SALT

A mixture of 137 g. (0.347 mole) of 3-hydroxy-4-(4-methoxybenzoyl) - N - octadecylphenoxyacetamide described in Example IC above and 560 ml. of concentrated $H_2SO_4$ was heated for 70 minutes at 40 to 50° C. and was then poured with vigorous stirring into a mixture of 1 liter of saturated NaCl and 1 kg. of ice. The orange-pink solid which precipitated was filtered, and the solid was chopped in a high-speed mixer in the presence of a saturated salt solution and was refiltered. The solid was washed with 8 liters of salt solution and the solid air dried. The crude pink-orange product was boiled for 30 minutes in 1500 ml. of methanol, filtered from the mainly NaCl residue and then treated with decolorizing carbon. On cooling, 119 g. (45.3% by weight yield) of pinkish-orange crystals was obtained.

A photographic emulsion was prepared by adding an aqueous solution containing 765 g. (4.5 moles) of $AgNO_3$ to an aqueous solution containing 750 g. of gelatin and a slight excess of NaCl. The resulting dispersion of a 646 g. AgCl (4.5 moles) precipitate was ripened and washed in a conventional manner. To each of two portions of the emulsion, containing 15.8 g. of AgCl, was added 307 g. of a solution consisting of 2.2 percent by weight (6.75 g.) of hexadecenyl succinimido indazolone and 4.4 percent by weight (13.5 g.) of gelatin. Twelve grams of the ultraviolet absorbing compound, 3-hydroxy-4-(4-methoxy-3-sulfobenzoyl) - N - octadecyl - 6 - sulfophenoxyacetamide sodium salt, prepared as described above in this example, was added to boiling water to make 400 g. of solution (a 3% by weight solution), and the solution added to one of the emulsion portions. No ultraviolet radiation absorber was added to the other emulsion portion. The two emulsion portions were then coated on cellulose triacetate photographic film base to give coating weights of 14 mg./dm.$^2$ of AgCl. Both films were overcoated with a conventional thin gelatin anti-abrasion coating. A 10 inch by 35 mm. film strip of each coating was cut, and each strip was exposed to white light in a conventional manner through a square-root-of-two-neutral-density step wedge. The strips were then developed in a conventional manner using p-aminodiethyl-aniline hydrochloride as the color coupling developing agent to produce a magenta image in each strip. Densities were taken at each step of the image, prior to and after the 81 hours and 21 minute exposure to a 100 watt General Electric projector floodlamp ultraviolet lamp. The densities were greater in the film containing the ultraviolet absorbing compound. The magenta dye was essentially unchanged in the film containing the ultraviolet absorbing compound. Fading of the magenta dye was noticed in the film prepared without the ultraviolet absorbing compound.

EXAMPLE II

*Preparation of 4-benzoyl - 3 - hydroxy - N - octadecyl-6-sulfophenoxyacetamide sodium salt*

A. PHENYL-4-BENZOYL-3-HYDROXYPHENOXYACETATE

A mixture of 43 g. (0.20 mole) of 2,4-dihydroxybenzo-phenone, 43 g. (0.20 mole) of phenyl bromoacetate and 28 g. (0.20 mole) of $K_2CO_3$ powder (passed through 100 mesh screen) was refluxed with stirring in 430 ml. of acetone for 3 days. The pale yellow colored reaction mixture was poured into a well-stirred mixture of 1 liter of water, 1 kg. of ice and 80 ml. of concentrated HCl. After the ice had melted, the greenish-gray precipitate was filtered, washed with water and air dried. Forty-eight grams (69% by weight yield) of a greenish powder, melting point 151 to 153° C. was obtained.

B. 4-BENZOYL-3-HYDROXY-N-OCTADECYL-PHENOXYACETAMIDE

A mixture of 17.4 g. (0.05 mole) of phenyl-4-benzoyl-3-hydroxyphenoxyacetate and 130.5 g. (0.05 mole) of octadecylamine was ground in a mortar and then heated at 150 to 155° C. for 4 hours. The dark red liquid was cooled to 60° C. (solidified) and removed from the flask with the aid of 200 ml. of hot methanol. The crude product was dissolved by heating the methanol to boiling. Upon cooling overnight, 20.1 g. (79.8% by weight yield) of yellow solid product, melting point 84 to 88° C. deposited. The product was recrystallized from 150 ml. of glacial acetic acid and 10.9 g. (41.6% by weight yield) of a pale yellow solid, melting point 89.5 to 90.0° C. was obtained.

C. 4-BENZOYL-3-HYDROXY-N-OCTADECYL-6-SULFOPHENOXYACETAMIDE SODIUM SALT

A slurry of 10.9 g. (0.021 mole) of benzoyl-3-hydroxy-N-octadecylphenoxyacetamide prepared as described in Example IIB was prepared by adding the solid in 1 gram portions to 90 ml. of concentrated $H_2SO_4$ at 0° C. The mixture was held, with stirring, at this temperature for 30 minutes. The slurry was then heated to 25° C. for 2 hours and finally heated to 70° C. The mixture was poured into 1 liter of a saturated NaCl solution and 1 kg. of ice where a white curd separated. The white curd was filtered, mixed in a high-speed mixer with saturated NaCl and washed with a 1:1 saturated $NaCl:H_2O$ solution until the washings were no longer acid. After air drying, the white solid was recrystallized from 500 ml. of methanol to give 9.35 g. of a white powder (71.8% by weight yield). The compound was used in a photographic emulsion. The results obtained were similar to those of Example I.

Many other compositions within the scope of this invention can be produced in the same manner as those produced in Examples I and II. Exemplary benzophenone compounds will be listed below in Table I and the novel composition product therefrom will be listed in Table II (e.g., compound (a) of Table I when substituted for the benzophenone compound of the examples will produce composition (a) of Table II).

TABLE I.—SUITABLE BENZOPHENONE COMPOUNDS

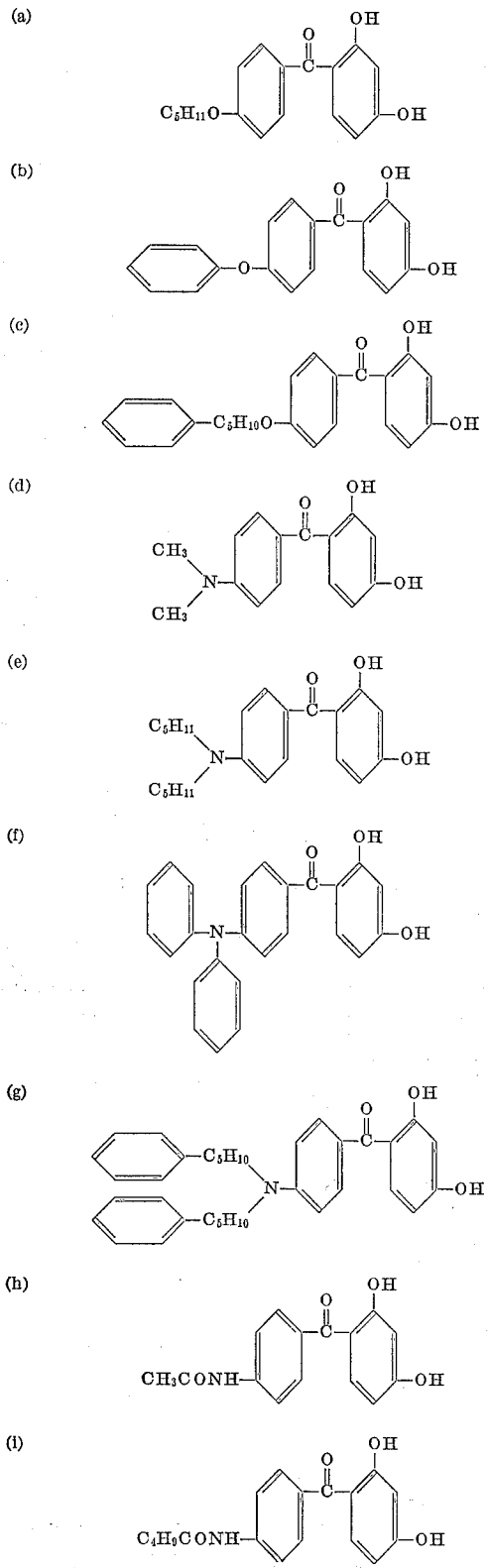

TABLE II.—IMPROVED ULTRAVIOLET-LIGHT ABSORBING COMPOSITIONS

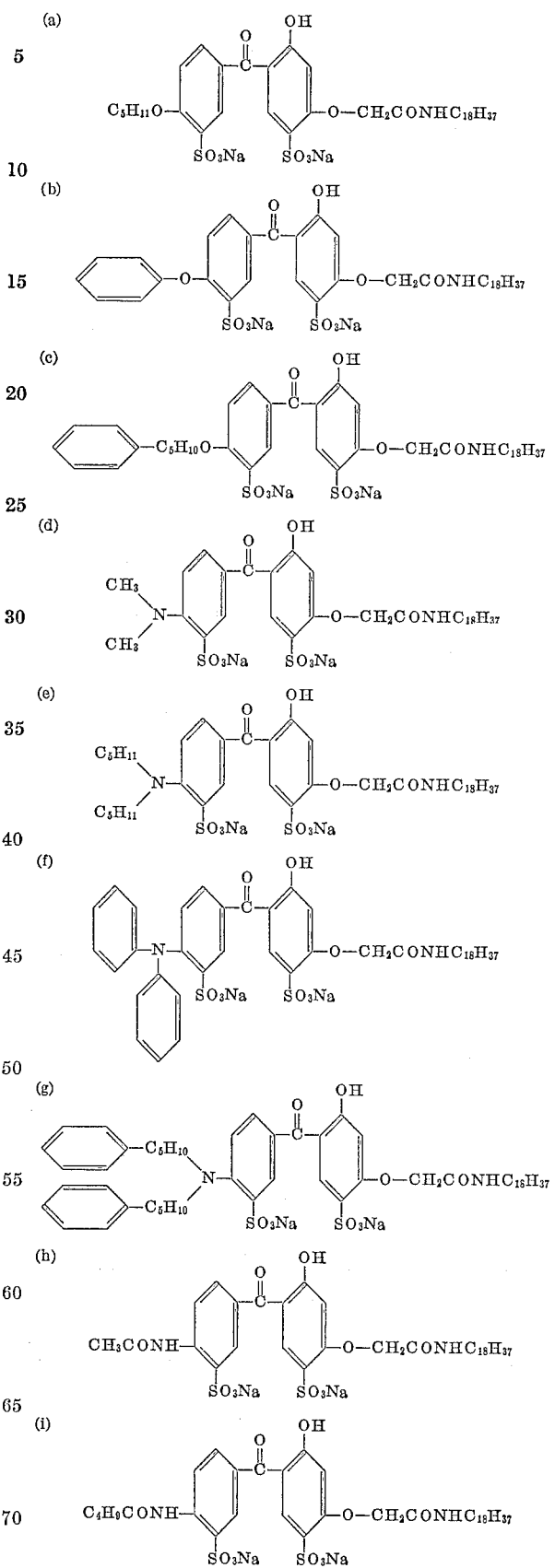

Many strong ultraviolet radiation absorbers have at least one electron donor in conjugation with at least one electron acceptor group. Ultraviolet absorbing compounds containing at least one electron acceptor group, e.g., carbonyl, nitro, sulfo, carboxyl, etc. and at least one electron donor group taken from the class consisting of hydroxy, primary amino, alkylamino and acylamino fulfill this description. Ultraviolet radiation absorption can be enhanced by the addition of electron donating groups on the benzene rings, preferably in conjugation with electron accepting groups. Examples of these electron donating groups are alkoxy of 1 to 5 carbon atoms, aryloxy of 6 to 11 carbon atoms, dialkylamino of 2 to 10 carbon atoms, diarylamino of 12 to 22 carbon atoms and acylamino of 2 to 5 carbon atoms. Suitable ultraviolet absorber compounds are of the benzophenone type, e.g., 2,4-dihydroxybenzophenone, 2,4 - dihydroxy-4'-methoxybenzophenone, hydroxyxanthones, 4-hydroxysalicylates, 4-hydroxysalicylamides, and those disclosed in U.S. Patents 2,686,812 and 2,763,657 and the hydroxy coumarin compounds of U.S. Patent 2,740,761.

The above-described ultraviolet radiation absorbing compounds, while useful compounds, can be modified to improve their properties, i.e., water solubility or dispersibility and non-diffusibility. A compound having at least one of the above-described electron acceptors and a non-chelated hydroxyl group is reacted with phenyl bromoacetate, to give a phenoxy-acetate intermediate. Other compounds which can be used in place of the phenyl bromoacetate include phenyl chloroacetate, alkyl chloro- and bromoacetates of 3 to 8 carbon atoms, etc.

The phenoxyacetate or other intermediate compound is then reacted with an octadecyl primary or secondary amine to yield the octadecyl phenoxyacetamide compound.

The acetamide is then sulfonated, e.g., by treating with sulfuric acid to achieve water compatibility. Other solubilizing groups can be used in addition to the preferred sulfonate group, e.g., carboxyl, quaternary ammonium, etc. The carboxyl solubilizing group is preferably present on the original ultraviolet radiation absorbing compound. The quaternary ammonium group can be added by procedures known in the art.

The novel compositions of matter prepared as described above are disclosed in column 1 above. Compositions of matter (1) preferably have the substituent R in the para or conjugated position to the carbonyl radical. Other compositions, however, in which R (see column 2) is ortho or meta to the carbonyl radical can be prepared by this invention. It is understood that when the position of R on the ring is changed, the position of the sulfonate group on the ring is likewise altered.

The novel compositions of matter prepared by the above-described process can be dissolved in water (compound I) or can be dispersed in water (compound II) and incorporated in photographic elements, e.g., multilayer photographic elements. The solution containing the ultraviolet light absorbing compounds can be coated over the light sensitive layer, coated as an intermediate layer or the compositions of matter can be combined in a colloidal binder solution, e.g., gelatin, polyvinyl alcohol, etc. and incorporated in the light-sensitive layer. The compositions of matter are also effective if they are coated on photographic films after processing.

In practice, the ultraviolet absorbers, i.e., compositions of matter of this invention, can be used in photographic elements as follows: a photographic film base, e.g., polyethylene terephthalate coated with a vinylidene chloride/methyl acrylate/itaconic acid copolymer as described in Example IV of Alles U.S. Patent 2,779,684, is coated with:

(1) A silver halide emulsion layer sensitive to red light and containing a non-migratory phenolic or naphtholic cyan color-former,
(2) A silver halide emulsion layer sensitive to green light and containing a non-migratory pyrazolone, or cyano acetyl magenta color-former,
(3) A silver halide emulsion layer sensitive to blue light and containing a non-migratory benzoyl acetanilide yellow color-former, and
(4) A gelatin antiabrasion layer containing the ultraviolet absorber compositions of this invention.

If desired, gelatin separation layers can be inserted between the light-sensitive layers. In addition, a filter layer for absorbing blue light can be used. A further modification of the above-described element can have the ultraviolet absorbers of this invention included in the latter-mentioned filter layer.

The above photographic element serves as an illustration of one particular form of a photographic element; other photographic element embodiments known in the art can be utilized with the novel ultraviolet absorbers, e.g., the color formation and sensitivity can be arranged differently in the various emulsion layers and need not necessarily be complementary.

Suitable film bases which can be used in addition to polyethylene terephthalate include cellulose acetate and triacetate, cellulose nitrate, various cellulose esters, polycarbonates and polyesters, glass plates and paper, etc.

Various silver halide emulsions and combinations can be used in a particular light-sensitive layer, e.g., silver chloride, bromide and iodide and combinations such as silver bromo-iodide, chloro-bromide, chloro-iodide and bromo-iodo-chloride.

Other non-migratory color-forming materials known to the art can be used in the emulsion layers.

The novel compositions of matter are useful as ultraviolet radiation stabilizers and as filtering agents in color photographic elements, e.g., those elements containing dyes and color formers which absorb radiation in the ultraviolet region. The novel compositions lessen color degradation considerably as illustrated by Example I. The compositions are also useful to insure that color formers or dyes in separate layers of a photographic film are not affected by ultraviolet radiation, e.g., as are unprotected magenta and cyan layers. The new compositions of matter are particularly useful in positive prints on paper or other opaque supports and in cine positive film, both of which are subjected to ultraviolet radiation in viewing.

The novel compositions of matter are either water soluble or water dispersible, are fast to diffusion and migration in multilayer photographic films, are stable in ultraviolet radiation, are strongly absorbent of ultraviolet radiation but not of visible light and are not reactive with a film substrate while in the excited electronic state. The instant process is simple and permits commercially available ultraviolet absorbers having at least one hydroxyl group in the meta or para position to the carbonyl radical to be converted into the improved ultraviolet radiation absorbers.

What is claimed is:
1. A water-dispersible, non-diffusible ultraviolet light absorbing composition having the formula:

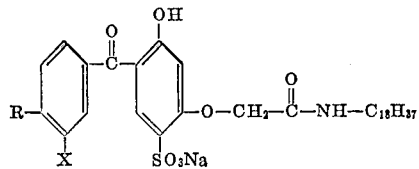

wherein,
R is selected from the group consisting of hydrogen, an alkoxy radical of from 1 to 5 carbon atoms, an aryloxy radical of from 6 to 11 carbon atoms, a dialkylamino radical of from 2 to 10 carbon atoms, a diarylamino radical of from 12 to 22 carbon atoms and an alkanoylamino radical of from 2 to 5 carbon atoms, and
X is selected from the group consisting of hydrogen and SO$_3$Na, and when R is hydrogen X is hydrogen.

2. A water-dispersible, non-diffusible ultraviolet light absorbing composition having the formula:

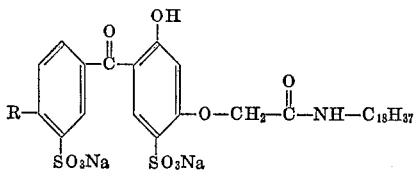

wherein, R is an alkoxy radical of from 1 to 5 carbon atoms.

3. A water-dispersible, non-diffusible ultraviolet light absorbing composition having the formula:

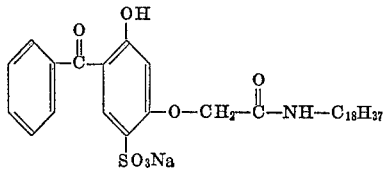

4. Composition according to claim 2 wherein R is a methoxy radical.

5. A process for preparing improved ultraviolet-light absorbing benzophenone compositions which comprises reacting the following compound:

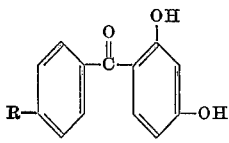

wherein,

R is selected from the group consisting of hydrogen, an alkoxy radical of from 1 to 5 carbon atoms, an aryloxy radical of from 6 to 11 carbon atoms, a dialkylamino radical of from 2 to 10 carbon atoms, a diarylamino radical of from 12 to 22 carbon atoms and an alkanoylamino radical of from 2 to 5 carbon atoms, with a haloacetate ester and powdered potassium carbonate, condensing the resulting benzoylhydroxyphenoxyacetate with octadecylamine, reacting the resulting amide compound with sulfuric acid and reacting the resulting sulfonate with a water-soluble sodium compound to form the sodium salt.

6. Process according to claim 5 wherein R is an alkoxy radical of from 1 to 5 carbon atoms and said haloacetate ester is phenylbromoacetate.

7. Process according to claim 5 wherein R is a methoxy radical and said haloacetate ester is phenylbromoacetate.

8. Process according to claim 5 wherein R is hydrogen and said haloacetate ester is phenylbromoacetate.

References Cited by the Examiner

UNITED STATES PATENTS

| | | | |
|---|---|---|---|
| 2,291,778 | 8/42 | Wakeman | 260—511 |
| 2,554,434 | 5/51 | Watkins | 260—511 |
| 2,614,940 | 10/52 | Freyermuth et al. | 260—45.95 X |
| 2,704,713 | 3/55 | Bent et al. | 96—56 |
| 2,719,086 | 9/55 | Sawdey et al. | 96—11 |
| 2,756,253 | 7/56 | Loria et al. | 260—507 |
| 2,808,330 | 10/57 | Sawdey | 96—11 |
| 2,976,259 | 5/61 | Mardy et al. | 96—84 X |

LORRAINE A. WEINBERGER, *Primary Examiner.*

LEON ZITVER, *Examiner.*